United States Patent
Durand et al.

(10) Patent No.: US 7,567,633 B2
(45) Date of Patent: Jul. 28, 2009

(54) RECEPTION DEVICE WITH DATA RECOVERY MECHANISM, ADAPTED TO TRANSMISSION SYSTEM USING A DIRECT SPREAD SPECTRUM SEQUENCE

(75) Inventors: Benoit Durand, Rousset (FR); Christophe Fraschini, La Garde (FR)

(73) Assignees: STMicroelectronics (Rousset) SAS, Rousset (FR); Universite de Provence (Aix-Marseille I), Marseille (FR)

(*) Notice: Subject to any disclaimer, the term of this patent is extended or adjusted under 35 U.S.C. 154(b) by 532 days.

(21) Appl. No.: 11/414,617

(22) Filed: Apr. 28, 2006

(65) Prior Publication Data

US 2006/0291541 A1    Dec. 28, 2006

(30) Foreign Application Priority Data

May 4, 2005    (FR) .................................... 0504592

(51) Int. Cl.
*H03D 1/00* (2006.01)
*H04L 27/06* (2006.01)

(52) U.S. Cl. .................. 375/340; 375/333; 375/329; 375/149; 375/362; 375/373; 329/304

(58) Field of Classification Search ................. 375/130, 375/150, 340, 333, 147, 329, 279, 282, 149, 375/362, 373, 371; 329/304
See application file for complete search history.

(56) References Cited

U.S. PATENT DOCUMENTS

| | | | | |
|---|---|---|---|---|
| 5,777,511 A | * | 7/1998 | Masumoto et al. ........... | 329/304 |
| 5,778,031 A | * | 7/1998 | Hiramatsu .................. | 375/333 |
| 6,118,831 A | * | 9/2000 | Masumoto et al. .......... | 375/340 |
| 6,154,487 A | * | 11/2000 | Murai et al. ................ | 375/150 |
| 6,160,838 A | * | 12/2000 | Shinohara et al. ........... | 375/130 |
| 6,590,872 B1 | | 7/2003 | Shiue et al. | |
| 2003/0123408 A1 | | 7/2003 | Saitou | |

FOREIGN PATENT DOCUMENTS

EP    0 884 856 A2    12/1998

OTHER PUBLICATIONS

FR Search Report FR 0504592; Nov. 23, 2005.

* cited by examiner

*Primary Examiner*—Phuong Phu
(74) *Attorney, Agent, or Firm*—Hogan & Hartson LLP

(57) ABSTRACT

A BPSK type reception device that includes a decoder for decoding a digital input signal, first and second comparators for delivering a decoded data signal and a data capture clock signal also includes a clock generator for generating a replacement clock signal, first and second latches controlled by the replacement clock signal to store the data taken, respectively, from the decoded data signal and from a signal that represents the sign of the signal at the output of the decoder, and a selection circuit for capturing, at each pulse edge of a clock signal that is offset with respect to the replacement clock signal, either the stored data originating in the sign signal in the case of loss of the previous data capture clock pulse edge at the output of the clock comparator, or the stored data originating in the data signal.

16 Claims, 4 Drawing Sheets

RECEPTION DEVICE WITH DATA RECOVERY MECHANISM, ADAPTED TO TRANSMISSION SYSTEM USING A DIRECT SPREAD SPECTRUM SEQUENCE

RELATED APPLICATION

The present application claims priority of French Patent Application No. 0504592 filed May 4, 2005, which is incorporated herein in its entirety by this reference.

FIELD OF THE INVENTION

The invention relates to, in general, the processing of digital signals and, in particular, the decoding techniques of these signals in radiofrequency digital communication applications. More specifically, the invention relates to a reception device, notably adapted to a transmission system using carrier binary phase-modulation (BPSK, Binary Phase Shift Keying) by a binary message on which Direct Spread Spectrum Sequence (DSSS) has been performed.

BACKGROUND OF THE INVENTION

In a digital signal transmission system that uses direct spread spectrum sequence, bits "0" and "1" are encoded using respective signals of a length that depends on the spread sequence used and then sent by the transmitter. The symbols are then received and decoded, at the receiver level, by the DSSS decoder that traditionally comprises a finite response filter.

In the case where the bits are encoded using an N-length Barker code, the symbols that encode bits "0" and "1" each appear in the form of a sequence of N symbol elements ("0" or "1") called "chips", distributed over one or another of two different levels (−1 and 1) and delivered at a predetermined fixed frequency F.

The symbol elements that encode bit "1" are negatively correlated to the corresponding symbol elements that encode bit "0"; that is, the same-level symbol elements in one or another of these symbols have opposite values.

For example, insofar as a symbol element of the symbol that encodes bit "1" is at level 1, the symbol element corresponding to the symbol that encodes bit "0" is at level −1. Likewise, insofar as a symbol element of the symbol that encodes bit "1" is at level −1, the symbol element corresponding to the symbol that encodes bit "0" is at level 1.

The spread binary message is then used to phase-modulate the carrier, presenting itself in the form of a time function sinusoidal wave expressed as p(t), $p(t)=\cos(2\pi f_p \cdot t + \phi)$, where fp is its frequency and $\phi$ is its phase at the source.

FIG. 1 illustrates the architecture of a reception string in a transmission system that uses direct spread spectrum sequence. This architecture traditionally leads to interfacing analogue radio modules 2 with a digital processing system that includes a DSSS decoder 3. Thus, the digital system is first captured by an antenna 1, then transmitted to the radio-frequency analog block 2 of the string.

The radio-frequency analog block typically includes a low-noise amplifier, a local oscillator attached to a mixer, cooperating to return the baseband signal, and a filtering stage. More specifically, at the output of the mixer, the binary message is available in continuous form in baseband, added to a high frequency component based on twice the carrier frequency. Indeed, this demodulation operation causes the appearance of the spectral pattern of the baseband signal, but also at twice the demodulation frequency; that is, around the frequency 2fp. Furthermore, a low-pass filtering stage is necessary at the output of the mixer in order to eliminate the harmonic distortion owing to the spectrum redundancy during the signal's demodulation. Therefore, at the output of the passband filter, only the baseband message is found; that is, returned around the frequency 0.

The resulting signal is then digitalized by an analog/digital converter (CAN). It is sampled at a sampling frequency that respects the Shannon limit. In other words, the sampling frequency is taken as being equal to at least twice the maximum frequency presented by the power spectrum density of the message spread over the baseband.

The operation of the elements described briefly above is not modified within the framework of this invention, and these elements will not be described in further detail.

At the CAN output, the signal is then sent to the DSSS decoder 3, allowing the recovery of the synchronization of the signal to be decoded with respect to the payload. More specifically, it is a finite impulse response filter, characterized by the coefficients $(a_i)_{i=0,1,\ldots,n}$ of its impulse response. The decoding procedure based on the finite impulse response filter includes matching the result of coefficients $a_i$ with the exact mirrored filter of the chosen spread code.

This type of filter, illustrated in FIG. 2, typically includes a sampler for capturing a sample of the input digital signal IN. The filter is ideally clocked at the same sampling frequency than that of the incoming signal. Its structure is that of an offset register REG that receives each sample of the input signal IN. The offset register includes N switches in the case of symbols with N symbol elements, which cooperate with a combinational circuit COMB, designed in a manner known by those skilled in the art, and utilizing the results of coefficients $a_i$ so that the output signal OUT produced by the same filter presents an amplitude that directly depends on the level of correlation found between the sequence of the last N samples captured by this filter and the sequence of N symbol elements of one of the two symbols, for example, the sequence of N elements of the symbol that encodes bit "1" of the digital signal.

Thus, the results of coefficients $a_i$ including the exact replica of the chosen spread code allow the correlation of the level of the symbol elements received in succession by the filter at its input, at the levels of the successive symbols of one of the two symbols used to encode bits "0" and "1", for example, symbol elements of the symbol that encodes bit "1".

Thus, for a Barker code with a length of N=11, each symbol is composed of 11 symbol elements such as A to K and A' to K', represented by the solid lines in FIG. 1, respectively for a bit "1" and for a bit "0".

If, for example, the filter receives in succession the symbol elements A" to K", composed in the same manner by symbol elements A' to K' forming the symbol that encodes bit 0, the output signal that it will deliver by correlating these symbol elements with the symbol elements A to K will have an amplitude equal to −11; this total being represented by the sum of the 11 negative correlation basic values equal to −1, where the first one provides the negative correlation between A" (level 1) and A (level −1), where the second provides the negative correlation between B" (level 1) and B (level −1), and so on, and where the eleventh provides the negative correlation between K" (level 1) and K (level −1).

Therefore, it can be noted that the symbol that encodes bit 0 at the input of the filter manifests itself on output by a spike with a value of −11, and in the same manner, the symbol that encodes bit 1 at the input of the filter manifests itself on output by a spike with a value of 11.

The output of the finite impulse response filter therefore provides synchronization spikes, where the sign gives the value of the source message bit at this time: if the spike is negative, it is "0", if the spike is positive, it is "1".

In order to transform the symbols decoded in this manner into a binary data stream that corresponds to the source message, and in order to associate to this data stream a related synchronization clock for capturing data, these spikes are passed through hysteresis comparators, 4 and 5, respectively. The data of the source message encoded over a bit, as well as the data capture clock signal, is therefore restored at the output of hysteresis comparators 4 and 5.

FIG. 5 can now be referenced, which shows the output signal of the data comparator 4, labeled comp_data, the output signal of the clock comparator 5, labeled CLK, and the output signal of the DSSS decoder, labeled output_DSSS, applied at the input of the comparators. The lower and upper threshold values of the comparators, respectively labeled low and up, are represented as horizontal dotted lines at the level of the DSSS output signal.

In the above example, the output signal of the DSSS decoder 3 is delivered to the data comparator 4, suitable for comparing the amplitude of this output signal with a lower threshold value low, for example, fixed at −8, and an upper threshold value up, for example, fixed at +8. The data comparator 4 therefore delivers, as an output digital signal comp_data representative of a decoded symbol of the input signal applied to the decoder, a first bit "1" when the amplitude of the output signal of the DSSS decoder is greater than the upper threshold value up, and a second bit "0" when the amplitude of the output signal of the DSSS decoder is lower than the lower threshold value low.

The output signal of the DSSS decoder 3 is also applied to a second comparator 5. This clock comparator 5 switches as soon as the amplitude of the output signal of the DSSS decoder passes above or below the lower threshold value low and as soon as the signal passes above or below the upper threshold value up and therefore provides a digital signal CLK to a bit that serves as a capture clock for the data. It should be noted that the lower and upper threshold values can be adjusted.

The output signals of comparators 4 and 5 are then processed by the receiver 6, which is rated to capture a data element of the data signal generated at the output of the data comparator 5, for example, at each pulse edge of the clock signal generated by the clock comparator 4. The comparator is designed to implement a certain number of operations, such as: detection of the message "start" or "stop", descrambling, message error correction, data storage, etc. The "start" and "stop" sequences of the message can be a specific sequence of bits, but it may also not contain the stop sequence if the length of the message is known ahead of time. Error correction can be performed using known techniques, such as the use of a cyclic redundancy check (CRC), the use of parity, and the use of Reed-Solomon type error corrector codes.

The CPU 7 (microprocessor) reads the data received by the receiver, as well as any additional information if it exists (communication status, interruption, detected errors, etc.)

Nevertheless, this reception device can only operate correctly if the output signal of the DSSS decoder, which is supplied at the input of the comparators, does not contain too many errors.

For example, still within the framework of the example in FIG. 3, if the DSSS decoder successively receives symbol elements A" to J" composed identically by symbol elements A' to J', and a last symbol element K" equal to zero following a transmission problem, the output signal that it will deliver by correlating these symbol elements with the symbol elements A to K will only have an amplitude equal to −9, the symbol element K" making a contribution of +1 to this output signal.

Of course, the situation would be exactly the same if the missing symbol element was not K" but rather any of the other symbol elements.

Similarly if, for example, the filter successively received symbol elements A" to I" composed identically of symbol elements A to I, and the last two symbol elements J" and K" are equal to zero following a transmission problem, the output signal that it delivers by correlating these symbol elements with the symbol elements A to K will have an amplitude equal to +7, this total being represented by the sum of the 9 basic correlation values equal to +1, where the first provides the correlation between A" (level −1) and A (level −1), where the second provides the correlation between B" (level −1) and B (level −1), etc., and where the ninth provides the correlation between I" (level 1) and I (level 1), the symbol elements J" and K" making a contribution of −2 to this output signal.

Under these conditions, with a lower threshold value fixed at −8 and an upper threshold value fixed at +8, the receiver will incorporate a symbol that encodes bit "1", the reception of successive symbol elements A" and K" having only 10 symbol elements that are correlated to symbol elements A to K (instead of 11), and will incorporate a symbol that encodes bit "0", the reception of successive symbol elements A" and K" having only 10 symbol elements that are negatively correlated to symbol elements A to K (instead of 11).

Therefore, it can be observed that the transmission faults that produce errors in the signal received can, to a certain extent, be overcome by adjusting the lower and upper thresholds of the comparators to intermediate values, for example greater than or equal to 8 and lower than or equal to −8 in the case of an N length Barker encoding equal to 11. To do this, the input signal is ideally not significantly altered by the transmission faults.

Indeed, when the received input signal of the DSSS decoder has too many errors, the spikes at the output of the decoder are therefore much lower and could be below the comparator thresholds. Therefore, there is a risk of introducing errors because certain clock pulse edges will be missing and the data will be false.

This phenomenon is illustrated in FIG. 5, which shows the output of the DSSS decoder when errors are present. The output signal of the DSSS decoder therefore passes by a negative spike in which the value is greater than the lower threshold of the comparators. Therefore, this results in a clock loss at the output signal CLK level of the clock comparator and, also, a false data element at the moment in which the clock pulse edge should have been produced.

It is possible to lower the comparator thresholds, but this would risk, with threshold values that are too low, taking into account output spikes of the DSSS decoder that represent errors and thus generating unwanted clock pulse edges at the output of the clock comparator and additional data.

Also, a correction system can be implemented using very powerful correction codes, but this would have the inconvenience of using large amounts of processing power.

Another possibility would be to use wider spread codes to free these errors, but this would negatively affect the bit rate.

Furthermore, the loss of a clock pulse edge at the output of the clock comparator creates an offset in the subsequent bits that compose the received signal, which makes error correction very difficult. For example, if an 8-bit message is sent:

"10101010" and a clock pulse edge is lost, "1011010" could be received. Therefore, 90 is received instead of 170.

SUMMARY OF THE INVENTION

In this context, the purpose of the invention is to correct the mentioned inconveniences, by proposing an improved BPSK reception device that avoids clock pulse edges (or creating unwanted clock pulse edges) at the output of the clock comparator placed behind the DSSS decoder and that avoids as much as possible capturing bad data, so that it can correctly decode the symbols of an input signal, even if the latter has been significantly altered by the transmission faults of several symbol elements.

With this aim in mind, the invention relates to a reception device adapted to a transmission system that uses a direct sequence spread spectrum that includes a decoder for decoding a digital input signal composed of bits, in which each bit, depending on its value, is represented by one or another of two symbols that respond to a spread code; each symbol being composed of a sequence of N symbol elements distributed over one or another of two different levels; the N symbol elements of the first symbol being negatively correlated to the corresponding N symbol elements of the second symbol; this device includes its own first and second comparator for comparing the amplitude of the output signal of the decoder with lower and upper threshold values; the first comparator delivering a data signal that is representative of the decoded symbols of the input signal, which includes a first bit when the amplitude of the output signal of the decoder is greater than the upper threshold value, and a second bit when the amplitude of the output signal of the decoder is lower than the lower threshold value; and the second comparator delivering a clock signal for capturing the data of said data signal, that includes a clock pulse edge as soon as the amplitude of the output signal of the decoder becomes lower than or greater than the lower threshold value and as soon as this amplitude becomes greater than or lower than the upper threshold value; said device being characterized in that it includes a first set of means for generating a replacement clock signal for data capture, traced on the clock signal originating in the clock comparator; a first and second set of means for frequency storage by the replacement clock signal for storing the data taken respectively from the data signal originating in the data comparator and from a binary signal generated at the output of the decoder; a set of second means for generating a clock signal, that is offset with respect to the replacement clock signal, and means for selecting data to be captured, at each pulse edge of the offset clock signal, either the stored data originating in the signal that is representative of the output signal sign of the decoder in case the previous clock pulse edge loss is produced at the output of the clock comparator, or the stored data originating in the data signal.

According to an embodiment, the first set of means for clock generation include a counter that receives, on input, the clock signal originating in the clock comparator; this counter being designed to calculate the duration between the two pulse edges of said clock and to compare the duration thus calculated with the length of a spread input signal bit; the replacement clock signal being delivered by said generation means as soon as the duration between the two consecutive clock pulse edges is approximately equal to said length of the spread input signal.

According to an embodiment, the second set of generation means include a counter that receives, on input, the replacement clock signal originating in the first set of clock generation means; this counter being designed to calculate the duration between two pulse edges of said replacement clock and to deliver the clock signal that is offset with respect to said replacement clock by a duration equal to half the length of a spread input signal.

Advantageously, the device includes means for generating a command signal for the data selection means indicating, at each pulse edge of the offset clock signal, whether the previous clock pulse edge of the clock signal originating in the clock comparator is present or not.

Preferably, the generation means of the command signal include a binary pair placed in a first logical status at each clock pulse edge of the offset clock signal and in a second logical status as soon as the clock signal originating in the clock counter presents a level 1. Preferably, the first and second comparators present adjustable upper and lower threshold values.

According to an embodiment, the decoder includes a finite impulse response digital filter adapted to the spread code used.

BRIEF DESCRIPTION OF THE DRAWINGS

Other characteristics and advantages of this invention will become more evident upon reading the following description, given as a non-limiting example and referring to the attached figures in which.

DETAILED DESCRIPTION

The invention therefore relates to a reception device, notably adapted to a transmission system that uses carrier binary phase-modulation by a binary message on which direct spread spectrum sequence has been performed. This device includes a first radio frequency analog part that transforms the signal received by the antenna into a low-frequency demodulated signal, and a second digital part with means for decoding that allow eliminating the spread applied to the original message.

Figure 1:
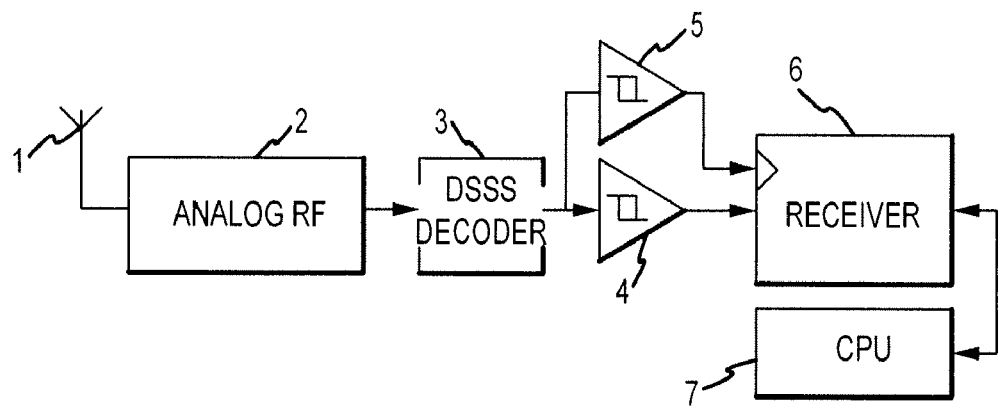
FIG. 1 illustrates a diagram of a traditional synchronous BPSK reception string.
Figure 2:
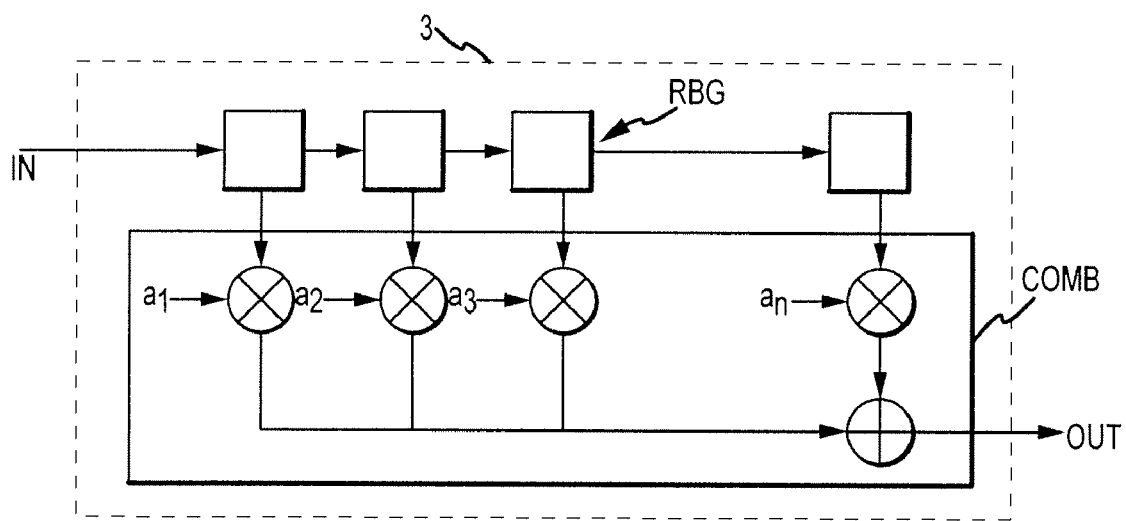
FIG. 2 illustrates the structure of the DSSS decoder in FIG. 1, in the form of a finite impulse response filter adapted to the spread code used.
Figure 3:
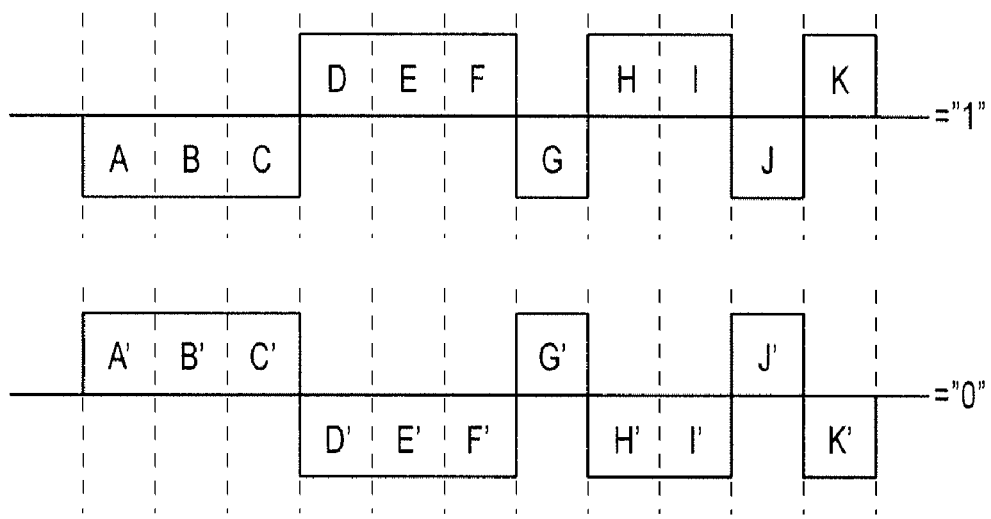
FIG. 3 is composed of two time diagrams in which the first illustrates a symbol that encodes bit "1" in the 11-length Barker code and in which the second illustrates a symbol that encodes a bit "0" in this same code.

This device is therefore designed to receive and decode a digital input signal composed of bits in which each one, depending on its value "1" or "0", is represented by one or another of two symbols as illustrated in FIG. 3, specifically where these symbols correspond to an 11-length Barker code.

These symbol elements are delivered at a predetermined fixed frequency F that corresponds to a specific period T=1/F, and the N symbol elements A to K of the symbol that encodes bit "1" are negatively correlated with N symbol elements A' to K' corresponding to the symbol that encodes bit "0".

In order to overcome the loss of data capture clock pulse edges (or the appearance of unwanted clock pulse edges) at the output of the clock counter 5, the data capture clock CLK is replaced with a new clock as quickly as possible.

Figure 4:
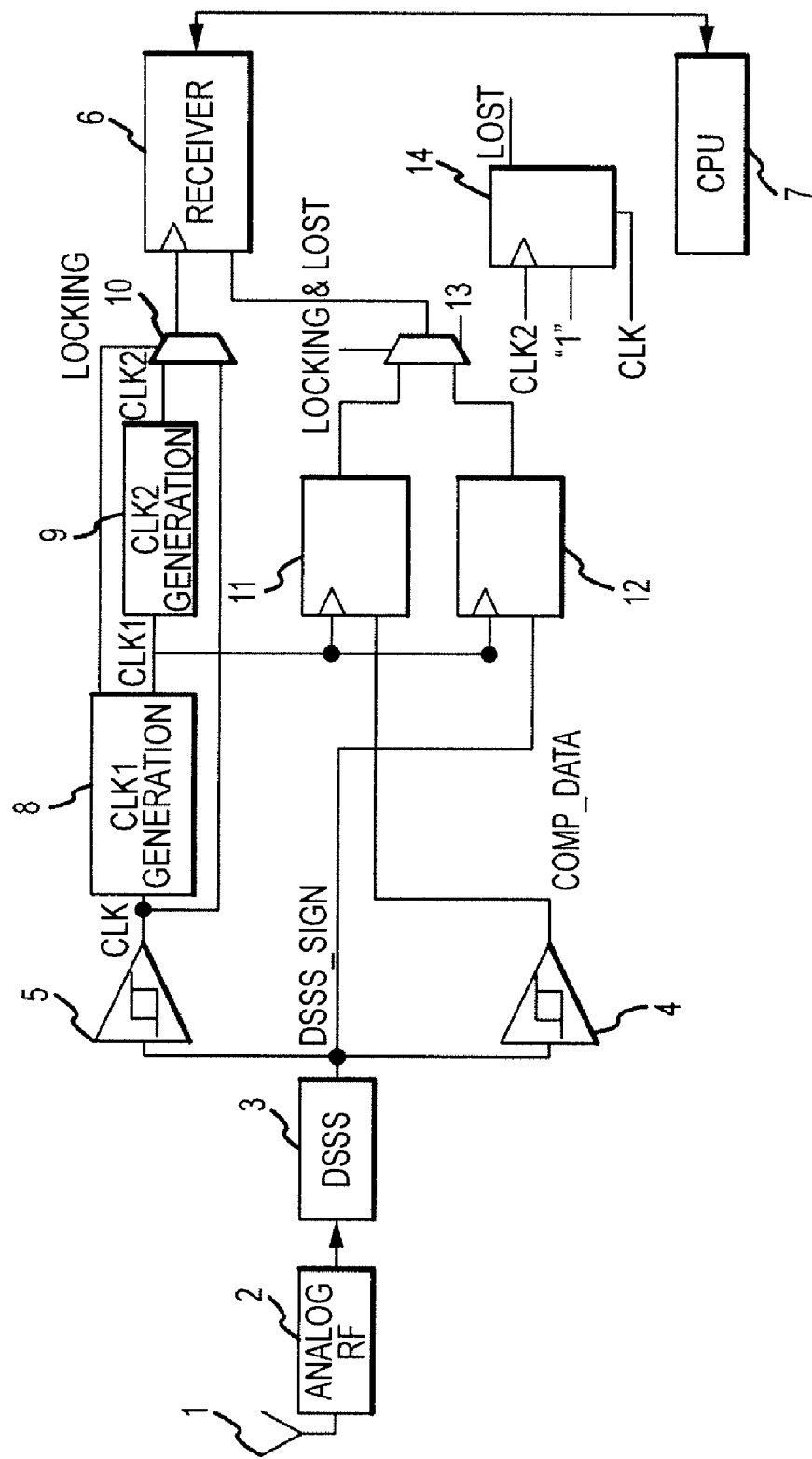
FIG. 4 illustrates a diagram of a BPSK reception device modified according to this invention.

Thus, as indicated in FIG. 4, the BPSK reception device according to the invention includes a first set of means 8 for generating the clock, which receive, on input, the clock signal CLK originating in the clock comparator 5 and providing, on output, a clock signal CLK1 that reproduces the data capture clock CLK.

Figure 5:
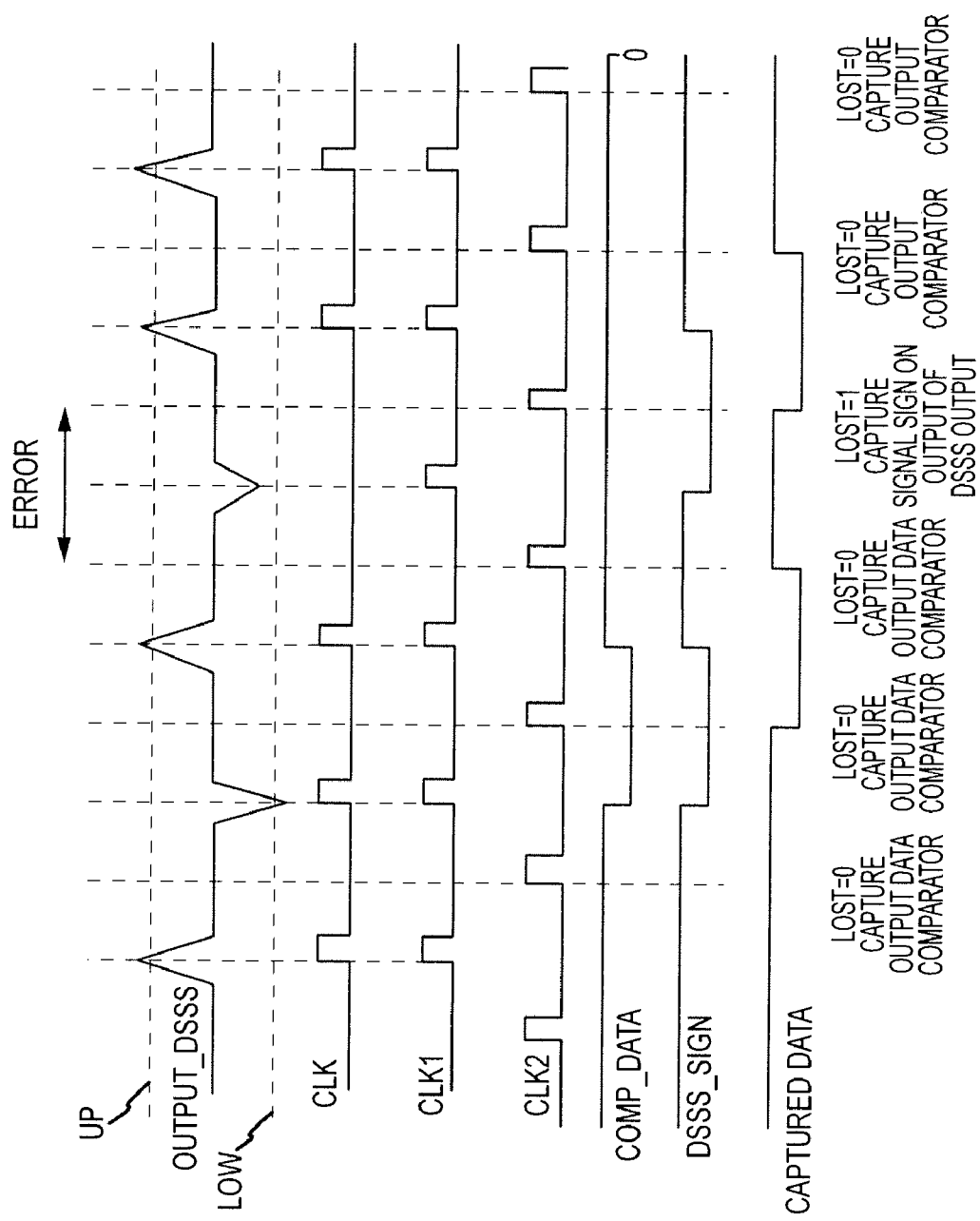
FIG. 5 is composed of seven time diagrams that represent the output signal of the DSSS decoder and the different clock and data signals that act in the reception device according to the invention.

To do so, the clock generation means 8 include a counter, designed to count the duration between the two clock pulse edges at the output of the comparator 5 generating the clock CLK and to compare the duration thus calculated with the length of a bit of the spread message. Because the spread sequence, as well as the bit rate (that is, the frequency of the signal on input of the DSSS decoder) is known, the length of the spread bit is therefore easily accessible. When the duration between two consecutive clock pulse edges CLK is equal to the length of a spread bit, within a certain margin, for example more or less 10%, it means that two consecutive bits have been decoded and it is therefore possible to replace the clock signal CLK from the comparator 4 with the clock signal CLK1 originating in the counter 8. The data signal capture clock signal CLK1 thus created is represented in FIG. 5. As can be observed in this Figure, the signal CLK1 advantageously presents a clock pulse edge in the presence of the error represented at the input of the DSSS, which is translated by a negative spike at the output of the DSSS below the low threshold of the clock comparator and consequently producing a loss of the data capture clock CLK at that moment.

This clock generation system can replace the data capture clock from the comparator as soon as possible or as soon as the "start" sequence of the message has been detected. The system is therefore locked on this recreated clock signal CLK1 and should be unlocked as soon as the "stop" sequence is decoded or when the length of the frame is known at the presumed end of the frame.

If the data capture clock CLK is replaced during the "start" sequence search period, an active automatic unlocking mechanism can be used after a duration equal to the duration of the "start" sequence in order to avoid being locked on a bad signal.

Additionally, by synchronizing the system to the recreated clock signal CLK1, the creation of additional clock pulse edges is avoided when the signal is found to be incorrect during a point in the communication.

By recreating the data capture clock signal CLK1 in this manner, all the data bits of the message to be decoded are safely obtained, since no data capture clock pulse edges will be missing and no unwanted pulse edges would have been created. Therefore, it will then be possible to use a Reed-Solomon type de-interleaving and decoding system (the data element sent being interleaved and encoded with Reed-Solomon codes) because, since the capture clock has been recreated, no offset in the frame is generated.

Nevertheless, as can be observed in FIG. 5 at the level of the error area, when a clock pulse edge CLK is missing at the output of the clock comparator 4, it means that the data signal may also be erroneous. Indeed, because the amplitude of the signal at the output of the DSSS decoder does not always pass under the lower threshold low, it will not switch the output of the data comparator 4. The value of the data signal comp_data on output of the data comparator 4 in the case of a loss of clock pulse edge is therefore the value at the previous clock pulse edge because the comparator has not switched. This can be accurate or not. In this case, according to the example in FIG. 5, the data signal comp_data at the output of the data comparator remains "1", when it should have switched to "0" because of the absence of errors if the negative spike at the output of the DSSS had passed normally below the threshold low.

The invention therefore includes, when there is a loss of a clock pulse edge, recovering the data element not based on the signal comp_data provided at the output of the data comparator 4, but rather based on a signal generated at the output of the DSSS decoder that supplies, on a bit, the signal sign at the output of the DSSS decoder.

Indeed, it can also be observed in FIG. 5 that, in the error area, the amplitude of the signal at the output of the DSSS decoder is also greater than it should be, but that, nonetheless, its sign remains correct; in this case, negative.

Furthermore, as explained above, the output of the DSSS decoder supplies synchronization spikes, in which the sign gives the value of the decoded source message bit. More specifically, according to the embodiment example, the symbol that encodes bit 0 at the input of the DSSS decoder manifests itself on output by a negative spike with a value of −11 and the symbol that encodes bit 1 at the input of the decoder manifests itself on output by a positive spike with a value of 11.

This characteristic is linked to the mathematical properties of the spread codes used (Barker) and it is more evident with long spread codes.

The signal DSSS_sign thus generated and representative of the signal sign at the output of the DSSS decoder is also represented in FIG. 5. It switches to "1" when a positive spike has been detected and to "0" when a negative spike has been detected, regardless of the comparison of the spike value with the lower and upper threshold values of the comparators.

The device according to the invention will therefore use its own clock CLK1 recreated as indicated above, but will also verify whether the clock pulse edges CLK are missing and, in this case, in order to recover the data element at the level of the receiver 6, the DSSS_sign that is the capture of the sign bit of the signal at the output of the DSSS decoder will be used instead of the data signal comp_data at the output of the comparator 4.

To do so, and as already explained above, the clock CLK from the comparator 4 will first be replaced by the internal clock CLK1. A second set of clock generation resources 9 that include a counter will then be used to receive, on input, the replacement clock signal CLK1 originating from the first set of clock generation means 8 and supply, on output, a clock signal CLK2, represented in FIG. 5, offset with respect to the clock signal CLK1 by a duration that is half the length of the spread bit.

Thus, when two consecutive clock pulse edges CLK are detected and the clock signal CLK at the output of the clock comparator 4 has been replaced by the clock signal CLK1, the system is locked and will then operate based on the time provided by the clock signal CLK2. In practice, the clock selection means, formed by a logical gate 10 and controlled by a locking signal from the first set of clock generation means 8, allow delivering to the receiver 6, as a clock signal, the signal CLK2 generated at the output of the second set of clock generation means 9, which is offset by a half-period with respect to the signal CLK1.

This offset will be built on in order to subsequently verify the presence or absence of a clock pulse edge at the output of the comparator 5 that generates the clock CLK.

Means 14 are then used to generate a "lost" signal that indicates, at each pulse edge of the signal CLK2, whether a clock pulse edge of the signal CLK from the clock comparator 4 was present during the preceding half-period.

If the "lost" signal is determined to be equal to 0, which means that no clock pulse edge CLK has been lost at the output of the comparator 5, then the data element captured by the receiver 6 is the data element that comes from the output signal comp_data of the data comparator 4.

Otherwise, when the "lost" signal is determined to be equal to 1, which means in this case that a clock pulse edge CLK at the output of the comparator 5 has been lost during the preceding half-period, the data element captured is the data element that comes from the signal DSSS_sign, which represents the sign of the signal at the output of the DSSS decoder.

The signal of the captured data according to this principle is represented in FIG. 5.

More specifically, the "lost" signal generation means 14 include a latch that is set to "1" at each clock pulse edge of the signal CLK2 and that is set to "0" as soon as the output of the clock comparator 5 changes to "1"; that is, each time that there is a level 1 on the clock CLK. By default, the output of the latch 14 is therefore set to "0", which means that the clock has not been lost at the output of the clock comparator 5.

In order for the receiver 6 to capture the data element on the clock pulse edge CLK2 according to one or another of the signal comp_data generated at the output of the data comparator 4 and the signal DSSS_sign that represents the sign of the output signal of the DSSS decoder 3, latches 11 and 12 associated to the selection means 13 are implemented.

The two latches 11 and 12 are rated by the clock signal CLK1. They will allow maintaining in the memory, during the period of time between a clock pulse edge CLK1 and a subsequent clock pulse edge CLK2, the binary information that corresponds to the data captured respectively from the signal comp_data and the signal DSSS_sign.

The output signals of latches 11 and 12 are provided at the logical gate 13, which allows selecting, depending on the values of the "locking" and "lost" signals, the data signal from either latch 11 or latch 12.

Thus, when the system is locked and the "lost" signal is equal to "1", it means that a clock pulse edge CLK at the output of the comparator 5 has been lost during the previous half-period, the signal of the data element captured on the replacement pulse edge CLK1 and supplied by the gate 13 to the receiver 6 is the one taken as the output of latch 12 corresponding to the signal DSSS_sign. On the other hand, when the "lost" signal is equal to 0, it means that no clock pulse edge CLK at the output of the comparator 4 has been lost, so the signal of the data element captured on the replacement pulse edge CLK1 and supplied by the logical gate 13 to the receiver 6 is the one taken as the output of latch 11 corresponding to the signal comp_data.

The reception device according to the invention, with its data recovery mechanism as described above, based on the implementation of a replacement data capture clock and on the capture of the data signal based on the sign of the signal at the output of the DSSS decoder when the loss of a clock pulse edge at the output of the clock comparator is detected, advantageously allows significantly improving the performance of the reception device in terms of error rate, notably in the case of short spread codes.

While there have been described above the principles of the present invention in conjunction with specific materials, curve types, and dimensions, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A reception device for a transmission system that uses a direct sequence spread spectrum that includes a decoder for decoding a digital input signal composed of bits, in which each bit, depending on its value, is represented by one or another of two symbols that respond to a spread code; each symbol being composed of a sequence of N symbol elements distributed over one or another of two different levels; the N symbol elements of the first symbol being negatively correlated to the corresponding N symbol elements of the second symbol; the reception device comprising:

a first and a second comparator for comparing the amplitude of the output signal of the decoder with lower and upper threshold values, the first comparator delivering a data signal that is representative of the decoded symbols of the input signal, which includes a first bit when the amplitude of the output signal of the decoder is greater than the upper threshold value, and a second bit when the amplitude of the output signal of the decoder is lower than the lower threshold value, and the second comparator delivering a clock signal for capturing the data of said data signal, said clock signal including a clock pulse edge as soon as the amplitude of the output signal of the decoder becomes lower than or greater than the lower threshold value and as soon as said amplitude becomes greater than or lower than the upper threshold value;

first means for generating a replacement clock signal for data capture, traced on the clock signal originating in the clock comparator;

first and second storage means rated by the replacement clock signal for storing the data taken respectively from the data signal originating in the data comparator and from a binary signal generated at the output of the decoder, representative of the output signal sign of the decoder;

second means for generating a clock signal, that is offset with respect to the replacement clock signal; and data selecting means to capture, at each pulse edge of the offset clock signal, either the stored data originating in the signal that is representative of the output signal sign of the decoder in case of loss of the previous clock pulse edge at the output of the clock comparator, or the stored data originating in the data signal.

2. The reception device according to claim 1, wherein the first clock generation means includes a counter that receives, on input, the clock signal originating in the clock comparator, the counter being designed to calculate the duration between the two pulse edges of said clock and to compare the duration thus calculated with the length of a spread input signal bit, and the replacement clock signal being delivered by said first clock generation means as soon as the duration between the two consecutive clock pulse edges is approximately equal to said length of the spread input signal.

3. The reception device according to claim 1, wherein the second generation means includes a counter that receives, on input, the replacement clock signal originating in the first clock generation means, the counter being designed to calculate the duration between two pulse edges of said replacement clock and to deliver the clock signal that is offset with respect to said replacement clock by a duration equal to half the length of a spread input signal.

4. The reception device according to claim 1, further comprising means for generating a command signal for the data selection means indicating, at each pulse edge of the offset clock signal, whether the previous clock pulse edge of the clock signal originating in the clock comparator is present or not.

5. The reception device according to claim 4, wherein the generation means of the command signal includes a latch placed in a first logical status at each clock pulse edge of the offset clock signal and in a second logical status as soon as the clock signal originating in the clock comparator comprises a level "1."

6. The reception device according to claim 1, wherein the first and second comparators comprise adjustable upper and lower threshold values.

7. The reception device according to claim 1, wherein the decoder includes a finite impulse response digital filter adapted to the spread code used.

8. A reception device for a transmission system comprising:
   a first and a second comparator for comparing the amplitude of a DSSS output signal with lower and upper threshold values, the first comparator delivering a data signal, and the second comparator delivering a clock signal for capturing the data of said data signal, said clock signal;
   a first clock generator receiving the clock signal and for generating a replacement clock signal;
   first and second latches receiving the replacement clock signal for storing the data taken respectively from the data signal and from the DSSS output signal;
   a second clock generator for generating an offset clock signal, that is offset with respect to the replacement clock signal; and
   a selection circuit coupled to the first and second latches.

9. The reception device according to claim 8, wherein the first clock generator includes a counter.

10. The reception device according to claim 8, wherein the second generator includes a counter.

11. The reception device according to claim 8, wherein the selection circuit further comprising a command signal input for receiving a command signal.

12. The reception device according to claim 11, further comprises a latch for generating the command signal.

13. The reception device according to claim 8, wherein the first and second comparators comprise adjustable upper and lower threshold values.

14. The reception device according to claim 8, further comprising a decoder for generating the DSSS output signal.

15. The reception device according to claim 8, further comprising a receiver coupled to the second clock generator and the selection circuit.

16. A BPSK type reception device comprising:
   a decoder for decoding a digital input signal;
   first and second comparators for delivering a decoded data signal and a data capture clock signal;
   a clock generator for receiving data capture clock signal and for generating a replacement clock signal;
   first and second latches, controlled by the replacement clock signal to store the data taken, respectively, from the decoded data signal and from a signal that represents the sign of the signal at the output of the decoder; and
   a selection circuit for capturing, at each pulse edge of a clock signal that is offset with respect to the replacement clock signal, either the stored data originating in the sign signal in the case of loss of the previous data capture clock pulse edge at the output of the clock comparator, or the stored data originating in the data signal.

* * * * *

UNITED STATES PATENT AND TRADEMARK OFFICE
CERTIFICATE OF CORRECTION

PATENT NO.         : 7,567,633 B2  
APPLICATION NO. : 11/414617  
DATED                : July 28, 2009  
INVENTOR(S)       : Benoit Durand and Christophe Fraschini It is certified that error appears in the above-identified patent and that said Letters Patent is hereby corrected as shown below:

Title Page, Item (54) Title should read: -- RECEPTION DEVICE WITH DATA RECOVERY MECHANISM, ADAPTED TO A TRANSMISSION SYSTEM USING A DIRECT SPREAD SPECTRUM SEQUENCE --.

Signed and Sealed this

Fifteenth Day of September, 2009

David J. Kappos  
*Director of the United States Patent and Trademark Office*

UNITED STATES PATENT AND TRADEMARK OFFICE
CERTIFICATE OF CORRECTION

PATENT NO. : 7,567,633 B2  Page 1 of 1
APPLICATION NO. : 11/414617
DATED : July 28, 2009
INVENTOR(S) : Benoit Durand and Christophe Fraschini It is certified that error appears in the above-identified patent and that said Letters Patent is hereby corrected as shown below:

Title Page, Item (54) and Column 1, lines 1-4, Title should read:
-- RECEPTION DEVICE WITH DATA RECOVERY MECHANISM, ADAPTED TO A TRANSMISSION SYSTEM USING A DIRECT SPREAD SPECTRUM SEQUENCE --.

This certificate supersedes the Certificate of Correction issued September 15, 2009.

Signed and Sealed this

Sixth Day of October, 2009

David J. Kappos
*Director of the United States Patent and Trademark Office*